United States Patent
Nonoyama

(10) Patent No.: US 7,693,127 B2
(45) Date of Patent: Apr. 6, 2010

(54) TIME-DIVISION SYNCHRONOUS WIRELESS MODEM DEVICE

(75) Inventor: Yasumasa Nonoyama, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1042 days.

(21) Appl. No.: 10/519,551

(22) PCT Filed: Sep. 30, 2003

(86) PCT No.: PCT/JP03/12544

§ 371 (c)(1),
(2), (4) Date: Mar. 14, 2006

(87) PCT Pub. No.: WO2005/034399

PCT Pub. Date: Apr. 14, 2005

(65) Prior Publication Data

US 2006/0165113 A1     Jul. 27, 2006

(51) Int. Cl.
*H04B 7/212* (2006.01)
*G01R 31/08* (2006.01)
*H04J 3/00* (2006.01)
*H04J 3/24* (2006.01)
*H04W 4/00* (2006.01)
*H04W 24/00* (2006.01)
*H04W 72/00* (2006.01)

(52) U.S. Cl. ............... 370/347; 370/442; 370/252; 370/337; 370/341; 370/474; 455/450; 455/423

(58) Field of Classification Search ............... 370/347, 370/442, 252, 337, 341, 471, 474; 455/450, 455/423
See application file for complete search history.

(56) References Cited

U.S. PATENT DOCUMENTS

| | | | |
|---|---|---|---|
| 6,377,548 B1* | 4/2002 | Chuah | 370/233 |
| 6,529,520 B1* | 3/2003 | Lee et al. | 370/442 |
| 2002/0021711 A1* | 2/2002 | Gummalla et al. | 370/464 |
| 2002/0099854 A1* | 7/2002 | Jorgensen | 709/249 |

FOREIGN PATENT DOCUMENTS

JP         08-130774 A     5/1996

* cited by examiner

*Primary Examiner*—Vincent P Harper
*Assistant Examiner*—Ariel Balaoing
(74) *Attorney, Agent, or Firm*—Sughrue Mion, PLLC

(57) ABSTRACT

A time-division synchronous wireless modem device that includes: a modem unit which transmits and receives the communication packet; a communication state judging unit which obtains a transmission cycle period and a vacant communication slot from information contained in the header of the received communication packet; and a transmission timing controller. The controller selectively determines an arbitrary one of the communication slots in a next transmission cycle period when the communication packet is not received during the entire span of the one transmission cycle period, or selectively determines the one of the communication slots to be used by estimating a vacant one of the communication slots in the next transmission cycle period from the header of the communication packets when the communication packet is received.

18 Claims, 15 Drawing Sheets

TIME-DIVISION SYNCHRONOUS WIRELESS MODEM DEVICE

TECHNICAL FIELD

This invention relates to a time-division synchronous wireless modem device for performing time-division synchronous communications by being added to a wireless station in an existing short-wave wireless system.

BACKGROUND ART

In a conventional data transmission system, a reference time base common to individual terminal stations is provided such that specified times within the cycle period of the above-mentioned reference time base are allocated to the individual terminal stations in a one-to-one correspondence to provide transmission timings unique to the respective terminal stations, as shown in, e.g., JP 8-130774 A. Since each of the terminal stations performs a transmitting operation within the specified time period based on the unique transmission timing mentioned above at the time of data transmission, time-division transmission control can be performed without depending on control from the base station. In this system, each of the terminal stations performs data transmission based on a transmission timing signal therefor based on a reference timing generated by a transmission timing generator. This allows data transmission to the base station without transmission timings overlapping between one terminal station and another. In other words, data transmission does not depend on control from the base station, so that time-division transmission control is implemented.

However, since the reference time base common to the plurality of terminal stations is provided and the specified times within the cycle period of the reference time base are allocated to the individual terminal stations in a one-to-one correspondence, the unique transmission timings cannot be changed dynamically as required.

In the case of transmitting large-amount of data, each of the terminals stations can transmit the data only within the range of the transmission cycle period allocated thereto and cannot effectively use a communication slot not used by another terminal station.

Furthermore, since the reference time base common to the plurality of terminal stations is provided and the specified times within the cycle period of the reference time base are allocated to the individual terminal stations in a one-to-one correspondence, continuous communication longer than the continuous cycle period of the reference time base cannot be performed.

An object of this invention is therefore to provide a time-division synchronous wireless modem device which the efficiency in using communication slots is high.

DISCLOSURE OF THE INVENTION

A time-division synchronous wireless modem device according to this invention is provided at each of a plurality of wireless stations in a wireless system which transmits and receives communication packets containing a header between the individual wireless stations via one wireless channel by using, on a one-by-one basis, any of communication slots obtained through time division of a predetermined transmission cycle period by a predetermined unit transmission time, and includes: a modem unit which transmits and receives the communication packets; a communication state determination unit which obtains a transmission cycle period and the communication slots in use each contained in the header of a received communication packet; and a transmission timing controller which selectively determines an arbitrary one of the communication slots in a next transmission cycle period when the communication packet is not received during the entire span of the one transmission cycle period or selectively determines the one of the communication slots to be used by estimating a vacant one of the communication slots in the next transmission cycle period from the transmission cycle period and the communication slots in use each obtained by the communication state determination unit when the communication packet is received.

BEST MODE FOR CARRYING OUT THE INVENTION

Figure 1:
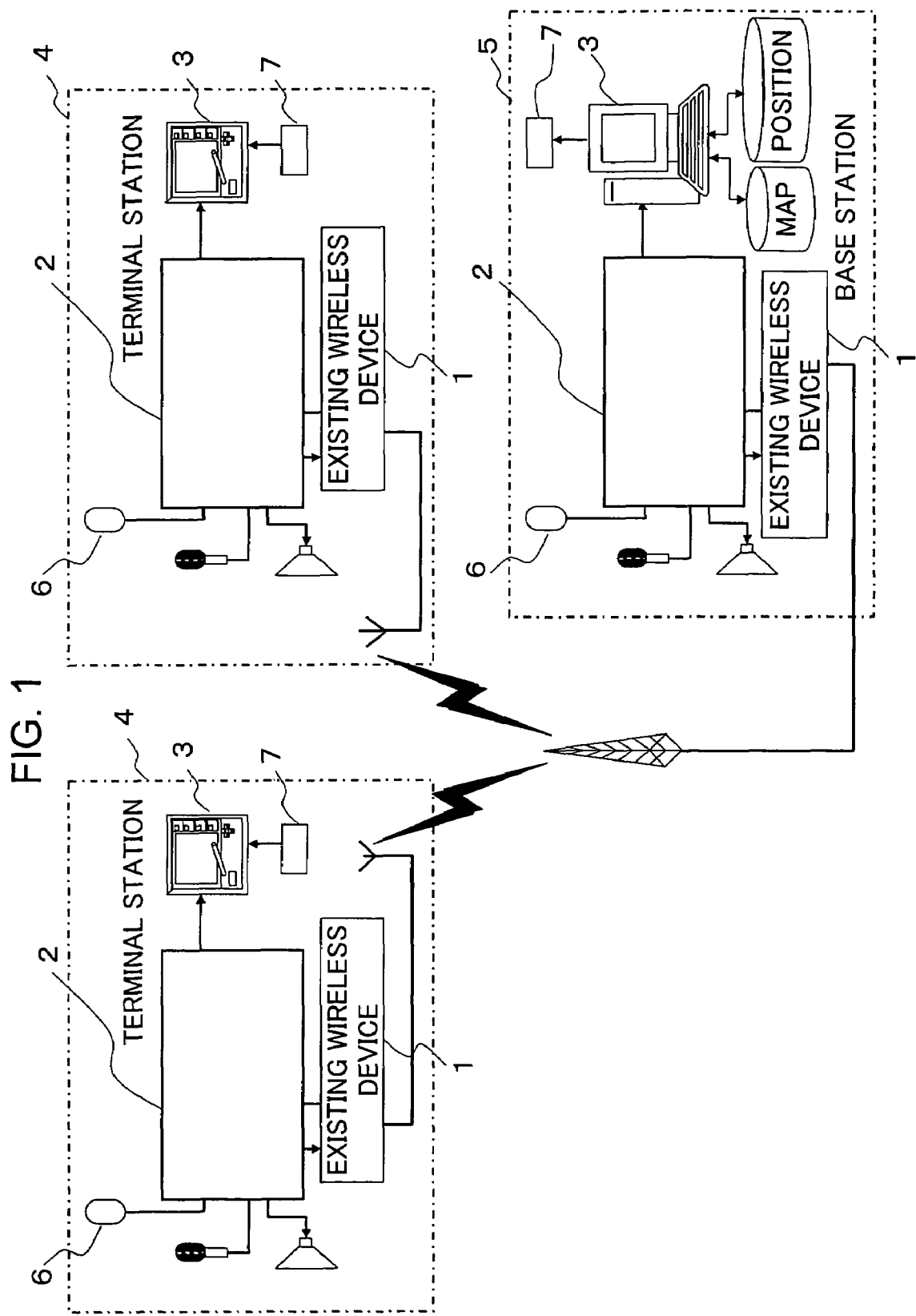
FIG. 1 is a view showing an overall system in which wireless modem devices each according to this invention are connected to wireless stations in an existing wireless system.

Referring to the drawings, preferred embodiments of this invention will be described herein below.

Embodiment 1

FIG. 1 is view showing an overall system in which time-division synchronous wireless modem devices (hereinafter referred to as the wireless modem devices) each according to this invention are connected to wireless stations in an existing wireless system.

The exiting wireless system is a system which performs short-wave wireless communication between a plurality of wireless stations (a base station 5 provided on the ground and terminal stations 4 provided on an aircraft or a ship) by using short-wave wireless communication. The following description will be for a terminal station provided on an aircraft. This invention is not limited to short waves and is applicable to existing communication systems using medium frequency waves, ultra-short waves, and the like. Although the terminal station provided on an aircraft will be described, the wireless modem device according to this invention is applicable to any communication system if provided on a mobile unit such as a ship or an automobile.

Each of the wireless devices (hereinafter referred to as the existing wireless devices) 1 in the existing wireless system is a device which performs transmission and reception by using short waves as a carrier wave.

A map display device 3 which displays the respective positions of its own aircraft and other aircraft, the flight track of associated aircraft, and the like is connected to each of wireless modem devices 2.

The entire system is so constructed as to realize the sharing of information between the map display devices 3 disposed at the base station 5 and the terminal stations 4 via the wireless modem devices 2.

On the other hand, each of the wireless modem devices 2 is connected to the existing wireless device 1 to convert a serial signal demodulated in the existing wireless device 1 to a parallel signal or convert information to a serial signal. The existing wireless device 1 modulates the carrier wave by using the serial signal and transmits the modulated carrier wave.

Three types of information are communicated from each of the terminal stations 4 to the base station 5 or between the individual terminal stations 4. The three types of information are periodic communication information composed of the position information of the terminal stations 4 which are periodically available from a GPS antenna 6, large-capacity information composed of video information resulting from image capturing using a video image capturing device 7 such as a digital still camera or a digital video camera, and non-periodic continuous information related to a voice encrypted conversation performed between the individual terminal stations 4 or between each of the terminal stations 4 and the base station 5.

The position information is composed of in-transit position information when the aircraft moves to an airspace where it executes an operation and under-operation position information during an operation action in which the aircraft frequently changes directions in the operation airspace.

Figure 2:
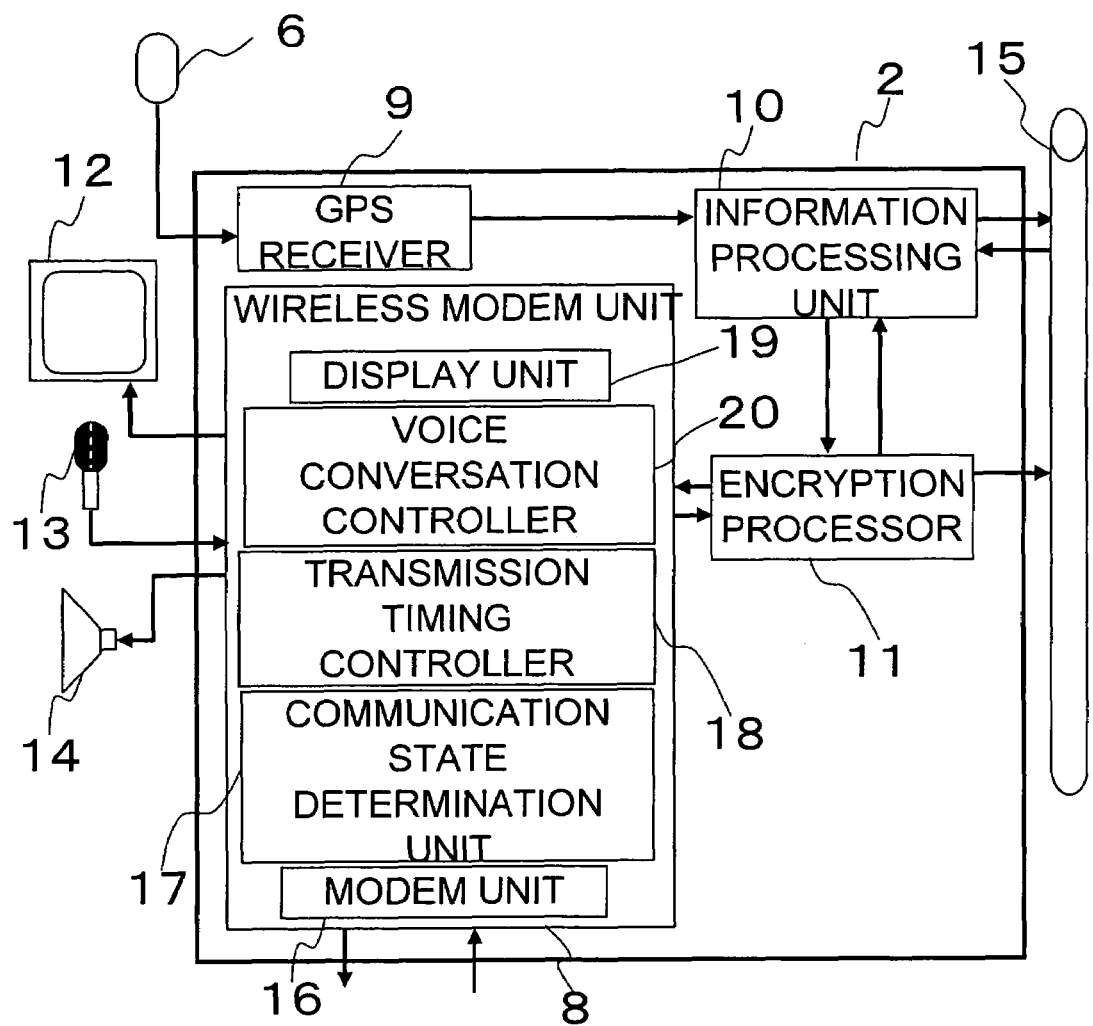
FIG. 2 is a block diagram showing a structure of the wireless modem device according to this invention and its associated devices.

FIG. 2 is a block diagram showing a structure of the wireless modem device 2 connected to each of the base station 5 and the terminal stations 4 and its associated devices.

The wireless modem device 2 has a wireless modem unit 8, a GPS receiver 9, an information processing unit 10, and an encryption processor 11.

Besides the GPS antenna 6, a display panel 12, a microphone 13, a speaker 14, and an Ethernet (registered trademark) 10 Base-T 15 are connected to the wireless modem device 2.

The wireless modem unit 8 has: a modem unit 16 which demodulates a signal received by the existing wireless device 1, transmits the demodulated received signal as data in an RS232C format to the encryption processor 11, and modulates the position information encrypted by the encryption processor 11, large-capacity information, and the like, into transmitting signals; a communication state determination unit 17 which determines communication states by interpreting the header portion of the demodulated received signal; a transmission timing controller 18 which controls the timing of transmitting each item of information based on the communication states and the setting of a transmission cycle period performed from the outside, which will be described later; and a display unit 19 for displaying the communication states on the display panel 12. The communication states include the transmission cycle period, the use status of communication slots, and the like.

The GPS receiver 9 converts a GPS signal inputted as data in an RS232C format via the GPS antenna 6 to position information. The position information is transmitted to the map display device 3 via the Ethernet 10 Base-T 15, while it is sent to the encryption processor 11.

As will be described later, the information processing unit 10 processes the large-capacity information in an activity report inputted from the map display device 3 via the Ethernet 10 Base-T 15 to transmittable data rows, temporarily stores the data trains, and transmits the processed information to the encryption processor 11. The information processing unit 10 also re-synthesizes the data trains decrypted by the encryption processor 11 to return them to the original large-capacity information.

The encryption processor 11 encrypts the position information and the activity report each to be transmitted, decrypts activity information and the like received by the existing wireless device 1 from the base station 5 and another terminal station 4, and generates an encryption key for performing encryption and decryption.

Further, the wireless modem device 2 has a voice conversation controller 20 for controlling the voice encrypted conversation using the microphone 13.

In addition, an own station number, a base station number, a state display item, the setting of aerial position data storage, a received aerial position, a video file storage period, the setting of the encryption key, a position information transmission cycle, and an image transmission size are inputted from the map display device 3 to the wireless modem device 2.

Each of the GPS receiver 9, the information processing unit 10, the encryption processor 11, the communication state determination unit 17, the transmission timing controller 18, the voice conversation controller 20, and the display unit 19 are composed of a computer having a central processing unit, a file, an interface circuit, and the like.

Figure 3:
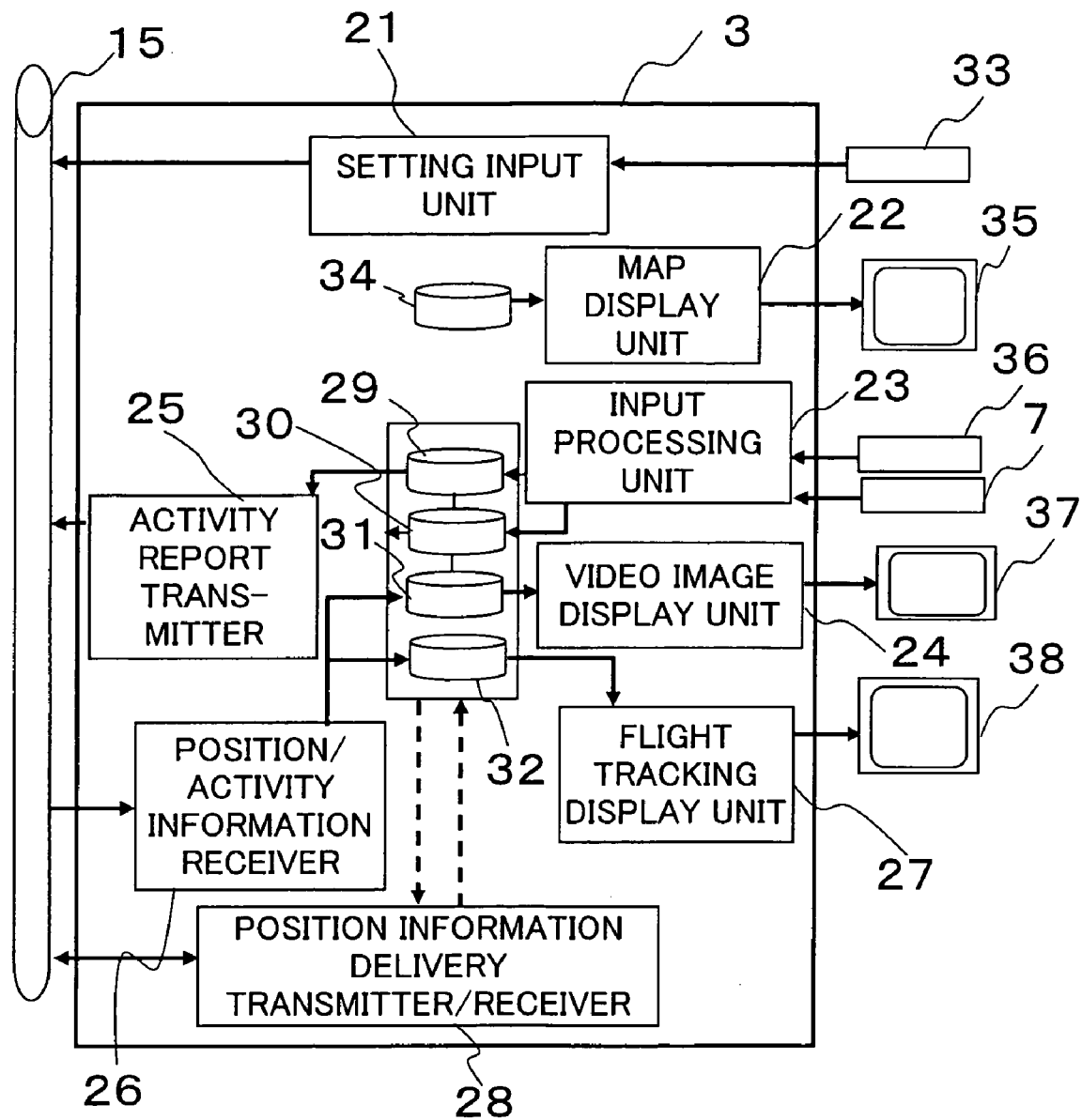
FIG. 3 is a block diagram showing a structure of a map display device according to this invention.

A description will be given next to a structure of the map display device 3 with reference to FIG. 3. The description will be given primarily to the content of information transmitted and received between the wireless modem device 2 and the map display device 3. As for the other parts, only the functional names thereof will be listed simply.

The map display device 3 has a setting input unit 21, a map display unit 22, an input processor 23, a video image display unit 24, an activity report transmitter 25, a position/activity information receiver 26, a flight tracking display unit 27, and a position information delivery transmitter/receiver 28.

The map display device 3 also has a hand-drawn information file 29, an image file 30, a visually recognized information file 31, and a mobile unit position information file 32.

The setting input unit 21 sets the own station number, the base station number, the state display item, the setting of aerial position data storage, the received aerial position, the video file storage period, the setting of the encryption key, the position information transmission cycle, and the image transmission size based on the information inputted from input setting means 33 composed of a keyboard or the like and transmits them to the wireless modem device 2.

The map display unit 22 displays the map of a required region on a map display panel 35 by using the information stored in an electronic map 34.

The input processor 23 loads hand-drawn geometric information associated with the activity inputted from a tablet 36 or the like, video information resulting from the image capturing of the activity inputted from the video image capturing device 7 such as a digital still camera or a digital video camera, visually recognized information on a ship or the like when it is found, and the like into the map display device 3. These items of information are stored individually in the hand-drawn information file 29, the image file 30, and the visually recognized information file 31.

The video image display unit 24 displays the video information stored in the image file 30 on the video display panel 37.

The activity report transmitter 25 transmits the hand-drawn geometrical information and the video information to the information processing unit 10 of the wireless modem device 2.

The position/activity information receiver 26 receives the position information of its own station inputted from the information processing unit 10 of the wireless modem device 2 and the position/activity information decrypted by the encryption processor 11 of the wireless modem device 2 and sent from the base station 5 or each of the terminal stations 4 and stores the received information in the mobile unit position information file 32.

Figure 4:
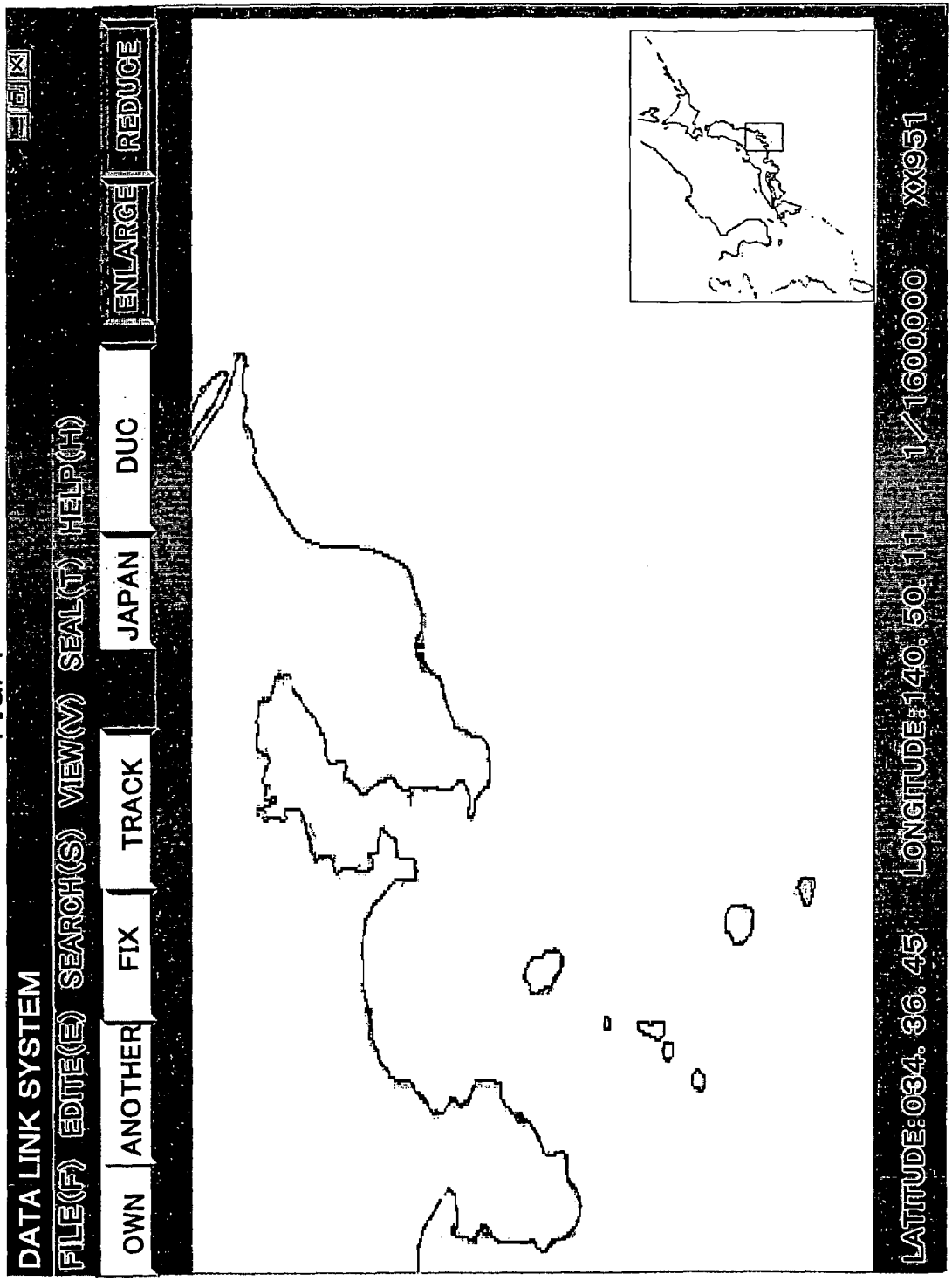
FIG. 4 shows map information displayed on the tracking display panel of FIG. 3.

The flight tracking display unit 27 displays the track of a flying object such as an aircraft stored in the mobile unit position information file 32 on a flight track display panel 38. It is also displayed that the track of the flying object of concern is being followed. FIG. 4 shows an example of display on the flight track display panel.

A description will be given next to information that can be transmitted and received by the wireless modem device 2. As the information, there are three types of information which are the periodic communication information, the large-capacity information, and the non-periodic continuous information.

The periodic communication information is position information which should be transmitted periodically in a predetermined cycle period. In each event of transmission, the periodic communication information is transmitted in an amount that can be transmitted by using one communication slot.

The large-capacity information is video information, voice information, or the like which need not be transmitted periodically. In each event of transmission, the large-capacity information is transmitted in a large amount that cannot be transmitted by using one communication slot. However, since the information need not be transmitted in real time, the information is divided such that it is transmitted by using a plurality of communication slots.

The non-periodic continuous information is information for which a transmission request occurs non-periodically, similarly to the large-capacity information, but is also information which should be transmitted continuously in real time in each event of transmission. Consequently, transmission is performed over a plurality of continuous communication slots during one event of transmission. Because a communication collision check time has been provided before the transmission of the periodic communication information or the large-capacity information is started, the presence or absence of transmission of the non-periodic continuous information is checked within the time. If the transmission of the non-periodic continuous information is being performed, the non-periodic continuous information is transmitted preferentially without transmitting the periodic communication information or the large-capacity information.

An existing wireless system has the following systemic constraints resulting from the configuration thereof.

Each event of transmission cannot be performed normally within a short period of 1 second or less. In this description, the shortest transmission cycle period has been fixed to 5 seconds in consideration of the constraints and designated as a unit transmission cycle period. Time division is performed by the shortest transmission cycle period, which is defined as a communication slot, so that information is transmitted on a per communication-slot basis.

By using the shortest transmission cycle period as a unit, a given number of the shortest transmission cycle periods are set as a transmission cycle period. In this description, 180 seconds has been determined as the transmission cycle period, which is referred to as a basic transmission cycle period. The number of communication slots contained in the basic transmission cycle period is 36. Since a transmitter can perform transmission by using these communication slots, there should be 36 transmission timings. The transmission timing controller 18 controls the transmission timings and sends a desired communication packet with a proper transmission timing.

Each of the base station and the terminal stations designates a time fetched from a GPS signal as a reference time and controls the transmission timing by using the reference time.

Figure 5:
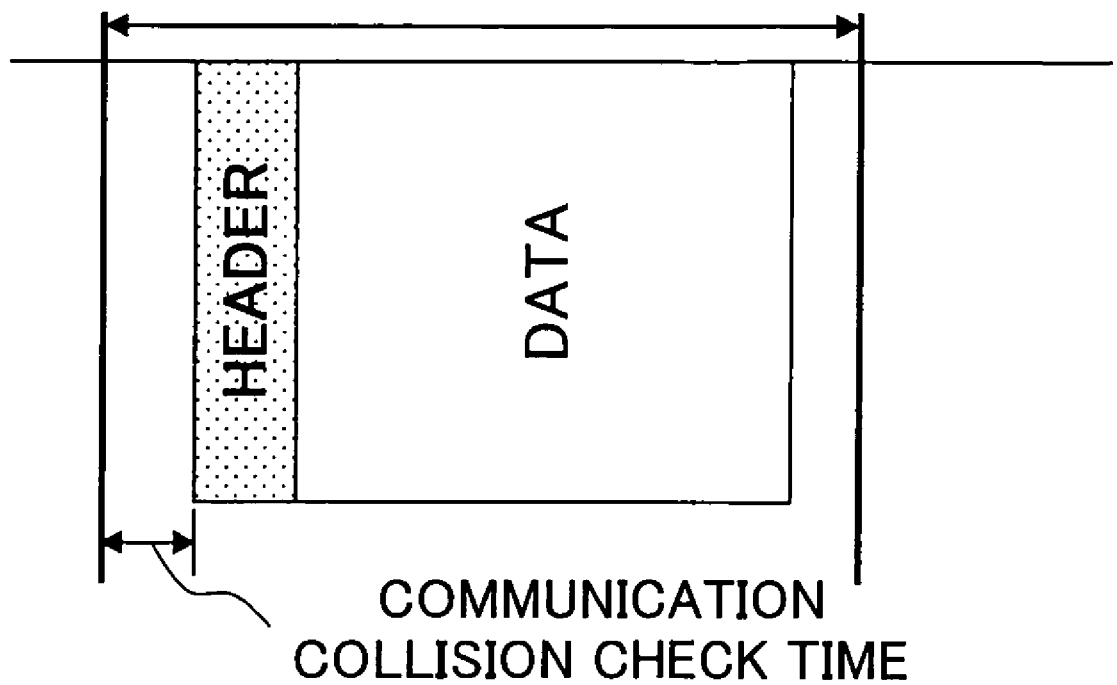
FIG. 5 is a diagram showing a structure of a communication packet according to this invention.

Each event of transmission uses a communication packet. As shown in FIG. 5, the communication packet is composed of a header and data. The header contains information on a transmitter station number, a transmission cycle period, and the number of devices under simultaneous operation. The data contains information to be transmitted. The communication packet is transmitted with a delay of 1 second as the communication collision check time from the beginning of one communication slot. Within the 1 second, the presence or absence of transmission from another station is detected to prevent a communication collision.

A description will be given next to the types of communication which can be performed by using the wireless modem device 2.

There are the three types of communication, which are the periodic communication, the large-capacity communication, and the non-periodic continuous communication.

The periodic communication selects one of a plurality of predetermined transmission cycle periods, selectively determines a communication slot in the transmission cycle period, and periodically transmits information by using the communication slot.

The transmission cycle periods include a basic transmission cycle period and at least one reduced transmission cycle period which is an integral fraction of the basic transmission cycle period. This description assumes that the shortest transmission cycle period is 5 seconds and uses the basic transmission cycle period having 36 communication slots each composed of the shortest transmission cycle period, a reduced transmission cycle period 1 which is one-sixth of the basic transmission cycle period, and a reduced transmission cycle period 2 which is one-third of the basic transmission cycle period. The shortest transmission cycle period is determined by the characteristics of the wireless modem device 2. Although the three transmission cycle periods are used in this description, this invention is similarly applicable to any cycle period as long as it is an integral fraction of the basic transmission cycle period.

When the three terminal stations 4 perform the periodic communication, each of the terminal stations 4 uses the first, second, and third communication slots in this order from the beginning of one basic transmission cycle period.

Each of the terminal stations 4 determines a transmission timing by checking the state of reception in the shortest transmission cycle period of the basic transmission cycle period and checking a vacant communication slot in the basic transmission cycle period or in the reduced transmission cycle periods 1 and 2.

The large-capacity communication is non-periodically performed by using a vacant communication slot in one transmission cycle period. The large-capacity communication features the transmission of large-capacity video information or the like in a divided manner.

When transmission for the periodic communication and the large-capacity communication is to be started, the reception of a communication packet from another wireless station is checked within the period set as the communication collision check time from the beginning of each of the communication slots and the transmission is started when there is no reception.

Although the non-periodic continuous communication is communication which is non-periodically performed, the information transmitted thereby cannot be divided. Once the non-periodic continuous communication is started, therefore, communication from another wireless station cannot be performed. In other words, the non-periodic continuous communication is preferential communication because it is communication which occupies a communication channel for a desired period of time.

The timing of starting the non-periodic continuous communication (voice communication) is determined such that transmission is started in accordance with the communication collision check time or from the beginning of the communication slot estimated to be a vacant communication slot as a result of determining the basic transmission cycle period.

A description will be given next to the procedure of time-division synchronous communication performed by using this time-division synchronous wireless modem device with reference to FIGS. 6, 7, 8, and 9.

Figure 6:
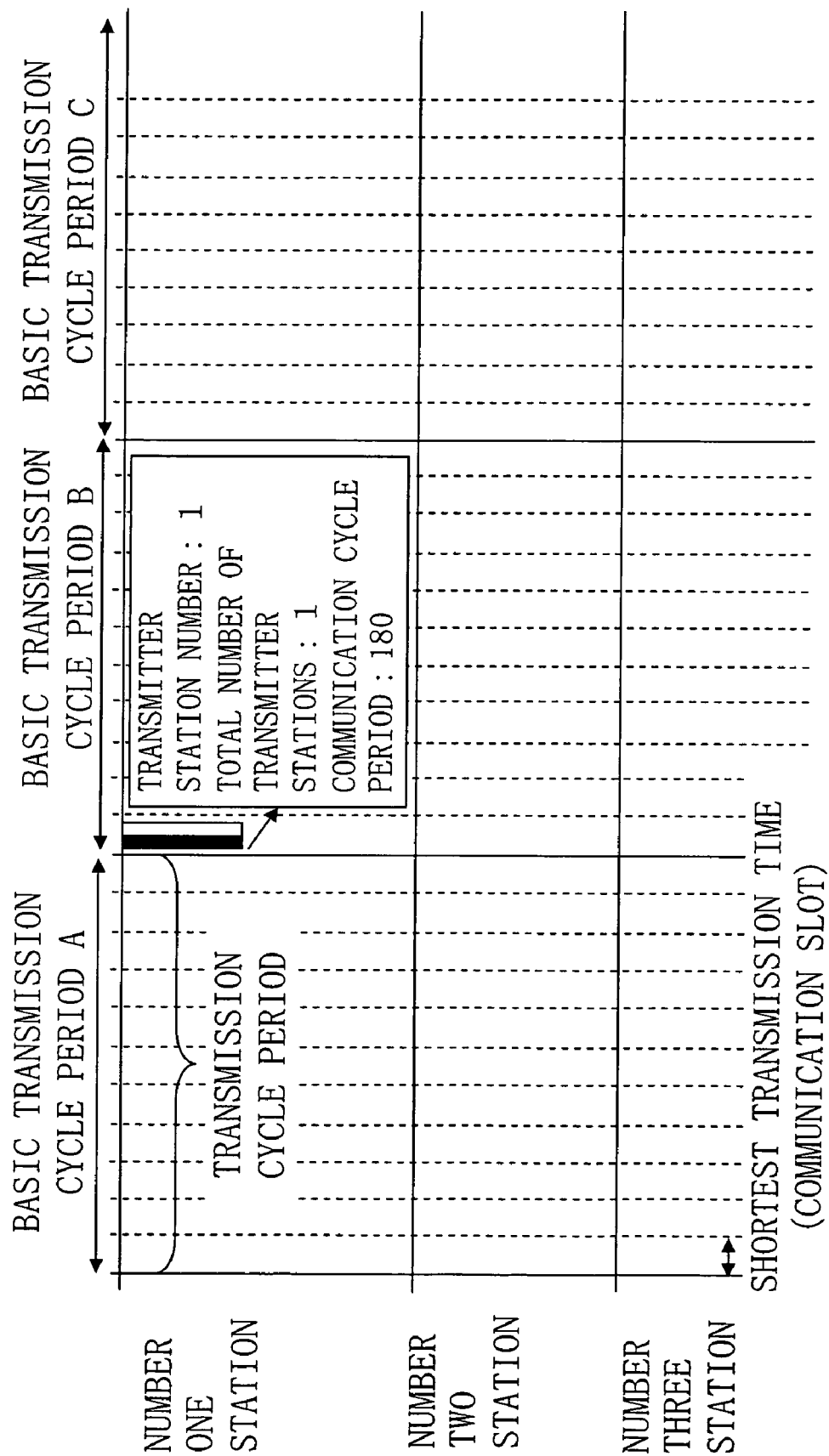
FIG. 6 is a transmission timing chart for a wireless modem device according to a first embodiment of this invention.

As shown in FIG. 6, the terminal station 4 (which is, in this case, the number one station) attempting to transmit information checks for the presence or absence of transmission from the base station 5 or from another terminal station 4 during the entire span of one basic transmission cycle period A. In this case, the transmission basic cycle period is 180 seconds so that the presence or absence of a communication packet is checked by examining an input from the existing wireless device 1 for 180 seconds.

When there is no communication packet from the base station 5 or from another terminal station 4, the number one station attempting the establishment thereof performs transmission by using a first communication slot in the next basic transmission cycle period B. At this time, it is checked whether or not a signal has been received from another terminal station 4 during the communication collision check time which is 1 second long from the beginning of the communication slot. When no reception is acknowledged, transmission is performed by using the first communication slot. The communication packet to be transmitted this time is composed of information to be transmitted as data and header information as header. As the header information, 1 is set as the transmitter station number, 1 is set as the total number of transmitter stations, and 180 seconds is set as the transmission cycle period. The transmitter station number, the total number of transmitter stations, and the transmission cycle period can be inputted from the setting input unit 2 of the map display device 3.

Figure 7:
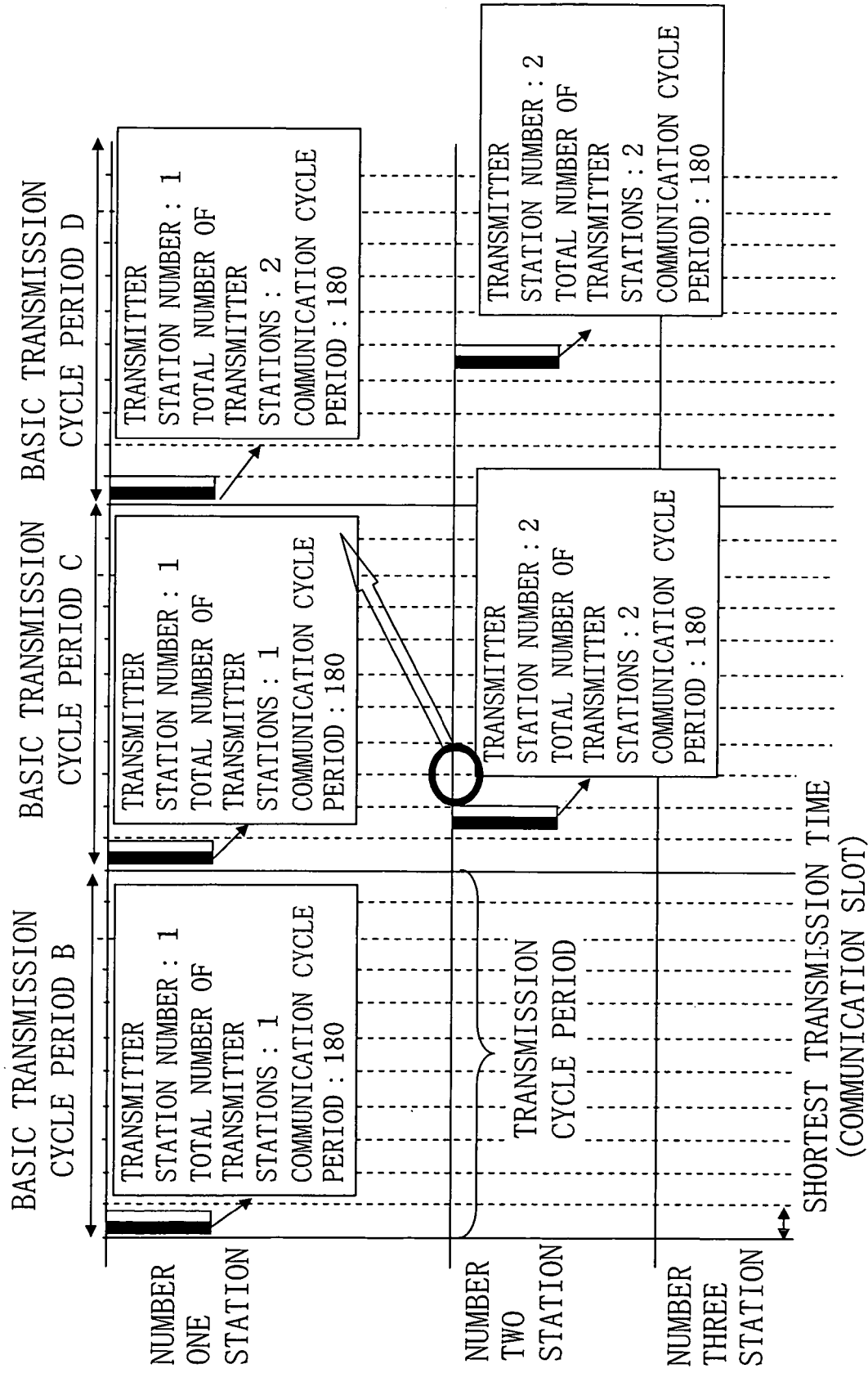
FIG. 7 is a transmission timing chart obtained when a terminal station succeeds in the establishment thereof.

On the other hand, when it is acknowledged that a signal was received during the communication collision check time of the communication slot, the transmission using the communication slot is stopped and transmission is performed in correspondence to the case where there is transmission from another wireless station, as shown in FIG. 7.

A description will be given next to the case where the periodic information communication is performed from another terminal station 4 (which is, in this case, the number one station), as shown in FIG. 7, and the number two station is newly requesting the establishment thereof. When there was transmission from the number one station during the basic transmission cycle period B and the number two station received it, the terminal station 4 (which is, in this case, the number two station) requesting the establishment thereof obtains the transmitter station number (which is, in this case, 1), the total number of transmitter stations (which is, in this case, 1), and the transmission cycle period (which is, in this case, 180 seconds) from the header information present in the communication packet received from the number one station. From the information, a vacant communication slot in the next transmission cycle period C is estimated. For example, when the total number of transmitter stations is 1 and the transmission cycle period is 180 seconds, it can be estimated that 35 communication slots are vacant and the first communication slot from the beginning of the basic transmission cycle has been used so that the number two station 4 requesting the establishment thereof selectively determines the second communication slot from the beginning of the basic transmission cycle period C and performs transmission by using the communication slot. At this time, the number two station 4 constitutes a communication packet by setting the transmitter station number to 2 and the total number of transmitter stations to 2 as the header information and transmits it.

Figure 8:
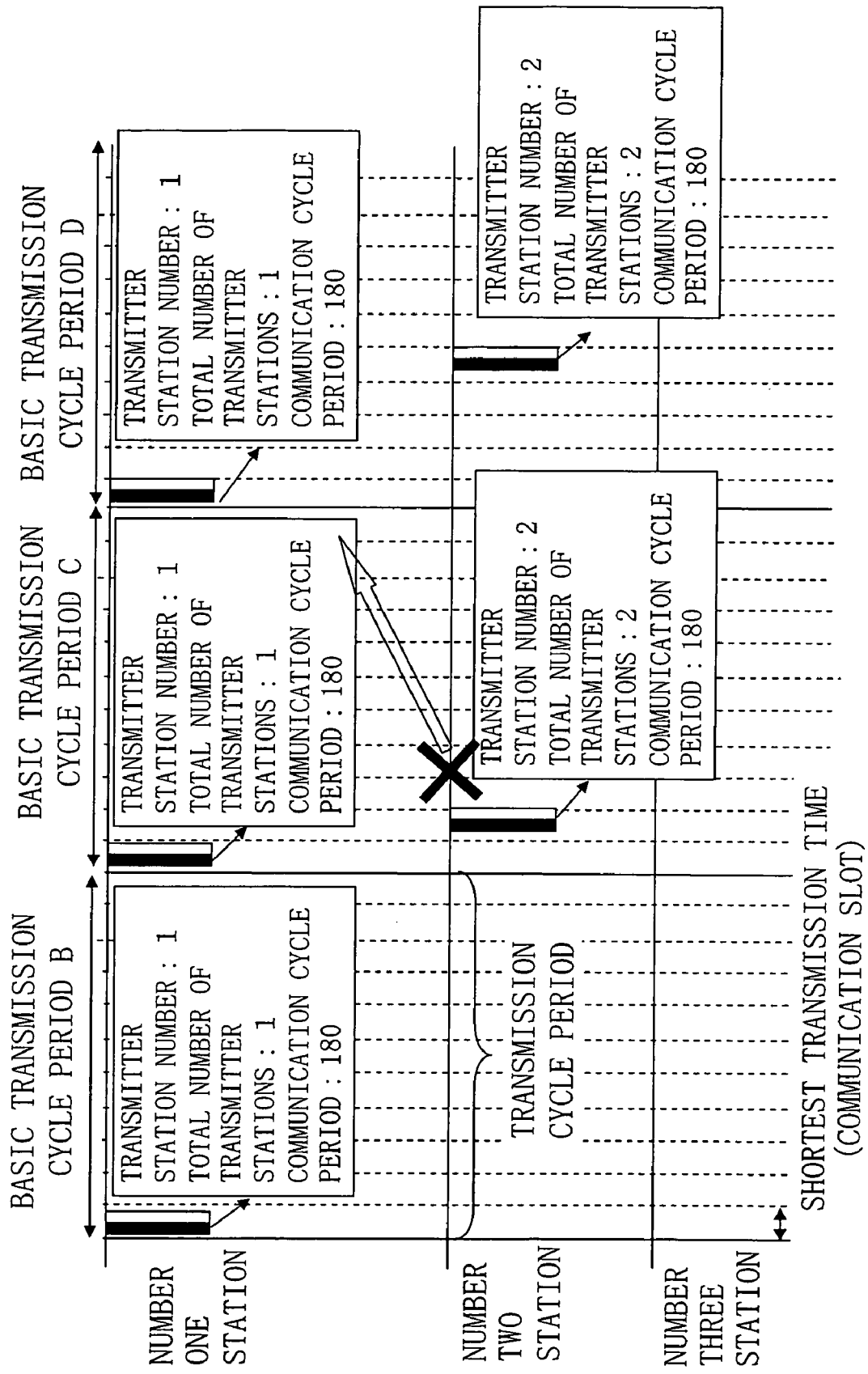
FIG. 8 is a transmission timing chart obtained when a terminal station fails in the establishment thereof.

Since the number one station is simultaneously performing the periodic information communication and the number one station is performing reception for a period extending over to the basic transmission cycle period C in which the number two station first performs transmission, if the transmission from the number two station is performed normally, 2 can be received as the total number of transmitter stations from the header information of the communication packet transmitted from the number two station. In a basic transmission cycle period D after the number two station performed transmission, the number one station transmits a communication packet for the periodic information communication by setting the transmitter station number to 1, the total number of transmitter stations to 2, and the transmission cycle period to 3 minutes as the header information thereof. If the transmission from the number two station was not performed normally as shown in FIG. 8, the header information of the communication packet transmitted from the number two station in the basic transmission cycle period C cannot be received so that the header information remains unchanged from that of the communication packet transmitted in the preceding basic transmission cycle period C even in the transmission from the number one station in the subsequent basic transmission cycle period D and is transmitted with the total number of transmitter stations being 1. Since the number two station is similarly performing the periodic information communication, it performs reception for a period extending over to the basic transmission cycle period D which is subsequent to the basic transmission cycle period in which the number two station first performed the transmission and can receive the header information of the communication packet from the number one station. At this time, if the number two station performed the transmission normally in the basic transmission cycle period C, the total number of transmitter stations in the header of the communication packet for the periodic information communication transmitted from the number one station in the basic transmission cycle period D ought to be 2. Accordingly, it can be determining whether or not transmission from the own station was performed normally by checking the change.

If it is acknowledged that the transmission was not performed normally, the number two station determines at random the communication slot again in the basic transmission cycle period D and performs transmission.

Figure 9:
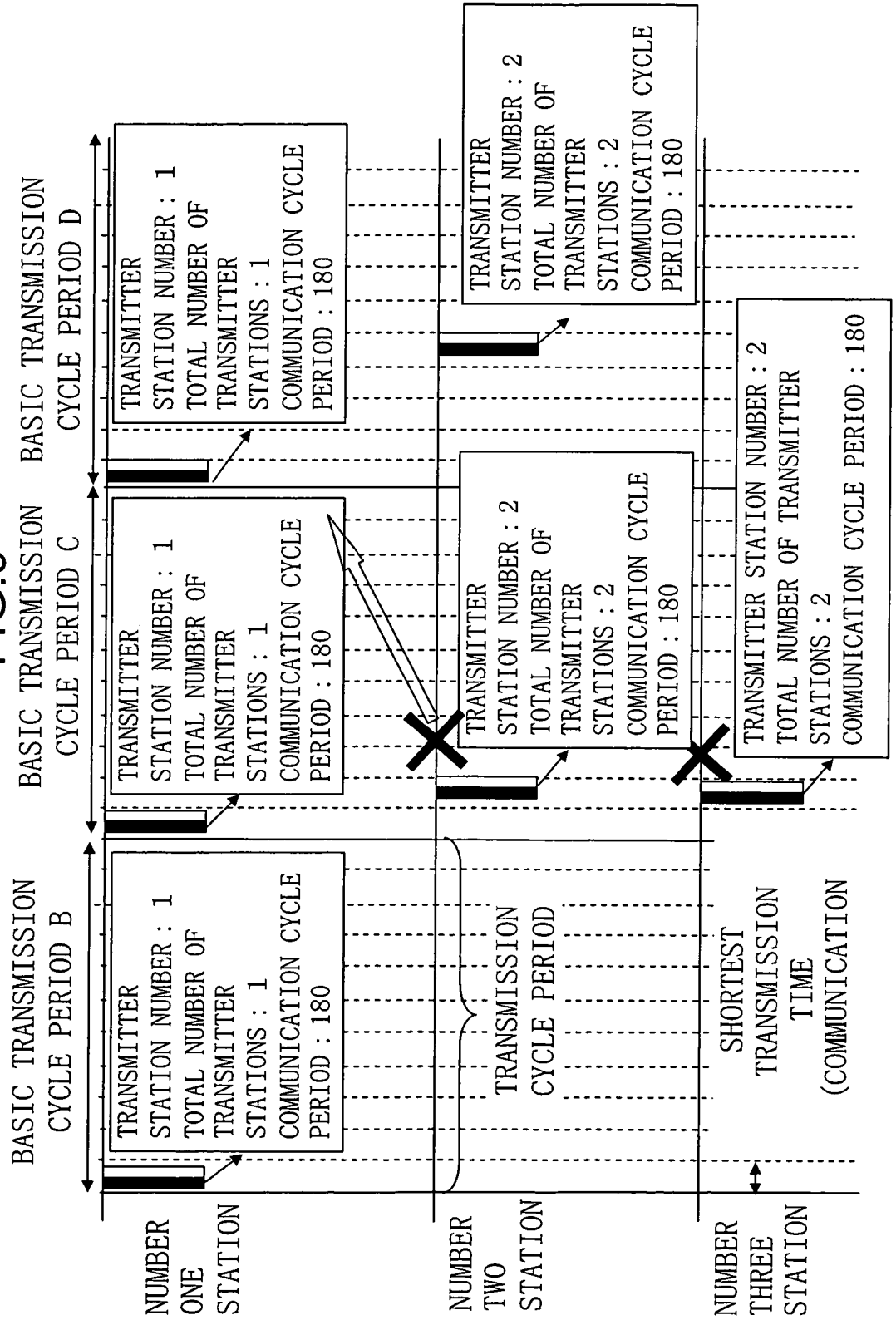
FIG. 9 is a transmission timing obtained chart when two terminal stations are to be established simultaneously.

A description will be given next to a situation in which the number two station and the number three station newly attempt the establishment thereof in the same basic transmission cycle period C, as shown in FIG. 9. The number two and three stations check transmission from other wireless stations throughout the entire span of the basic transmission cycle period B. Since only the number one station has been established in the basic transmission cycle period B, the number two and three stations independently determine the second one of the vacant communication slots. By thus similarly setting the transmitter station number to 2, the total number of transmitter stations to 2, and the transmission cycle period to 180 seconds as the header information, both of the number two and three stations newly perform transmission in the basic transmission cycle period C. When transmission from two or more wireless stations is thus performed by using the same communication slot, a collision occurs between the two or more communication packets so that transmission is not performed normally. Since the number one station is checking the situation in the basic transmission cycle period C, the number one station assumes that only itself is performing transmission and performs transmission by setting the total number of transmitter stations of the header information to 1 in the basic transmission cycle period D. At the same time, in the basic transmission cycle period D, both of the number two and three stations check the transmission from the number one station to detect whether or not transmission was performed normally. In such a case as shown in FIG. 9, it is determined from the header information from the number one station that transmission could not be performed normally. Both of the number two and three stations determine a communication slot at random and perform transmission.

Since such a wireless modem device performs transmission by estimating a vacant communication slot from the header information of the communication packet received in the preceding transmission cycle period, there is no adjustment of the transmission timing by a specified one of the wireless stations. Since time-division transmission timings occupied by the individual wireless stations are obtained based on the use status of the communication slots, wireless stations larger in number than the communication slots can perform communication by using one wireless channel.

Embodiment 2

Figure 10:
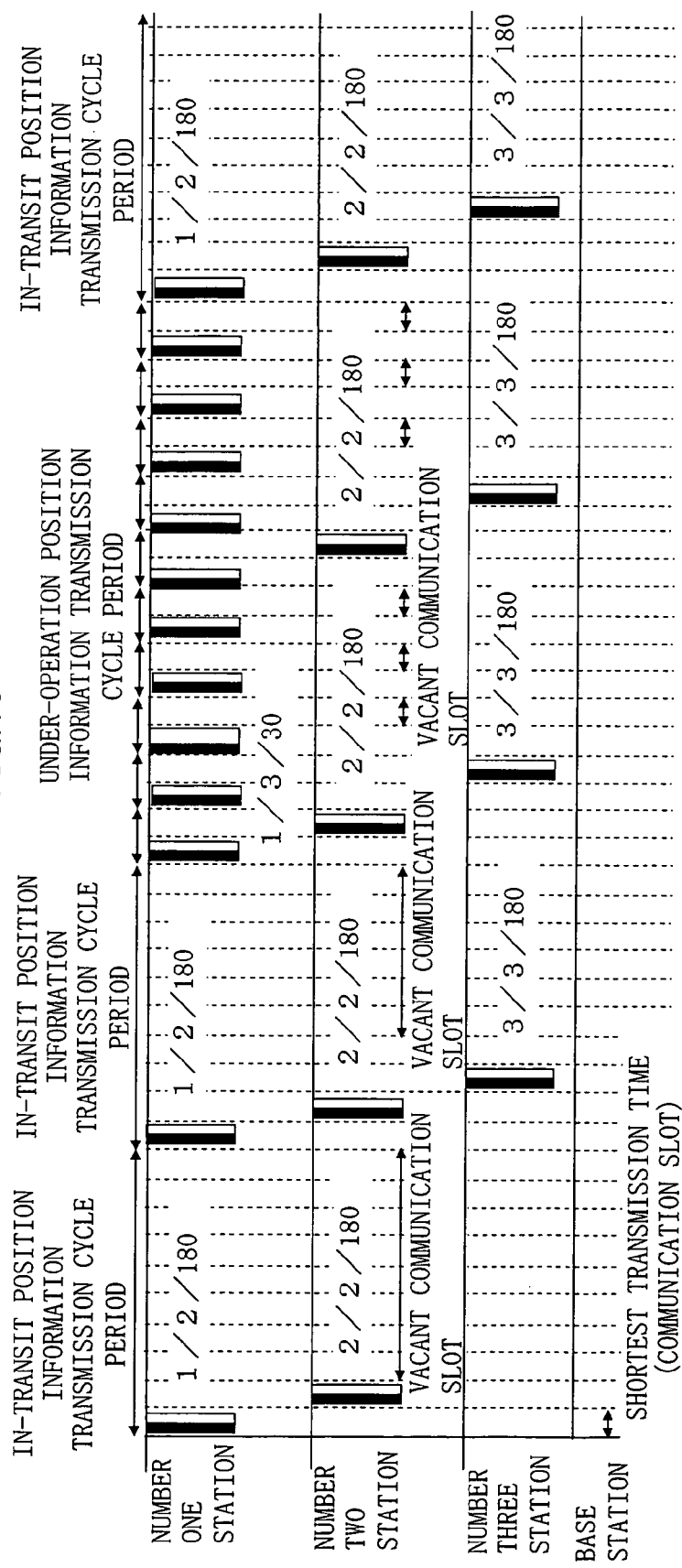
FIG. 10 is a transmission timing chart for a wireless modem device according to a second embodiment of this invention.

FIG. 10 is a transmission timing chart for a wireless modem device according to a second embodiment of this invention.

The number one station transmits, while an aircraft on which the wireless modem device 2 is provided is moving toward an objective airspace, position information on the position of the aircraft to the base station 5 by using the basic transmission cycle period. When the aircraft reaches the objective airspace, the number one station transmits the position information of the aircraft to the base station 5 by using the reduced transmission cycle period 1 shorter than the basic transmission cycle period. Specifically, the basic transmission cycle period is used as an in-transit position information transmission cycle period, while the reduced transmission cycle period 1 (in the cycle period of 30 seconds) is used as an under-operation position information transmission cycle period.

After the operation action is completed, the position information is transmitted again by using the normal basic transmission cycle period.

At the same time, each of the aircraft on which the number two and three stations are provided also transmit the position information of the station provided thereon to the base station 5 by using the basic transmission cycle period while moving toward an objective airspace.

The procedure for transmitting the position information will be described with reference to FIG. 10.

During one in-transit position information transmission cycle period, the number one station checks whether or not transmission from another station is performed. When there is no transmission from another station, the number one station transmits the position information by using the first communication slot from the beginning of the next in-transit position information transmission cycle period.

During one in-transit position information transmission cycle period, the number two station checks whether or not transmission is performed from another station. Since the transmission from the number one station can be acknowledged, the number two station periodically transmits the position information thereof by using the second communication slot from the beginning of the next in-transit position information transmission cycle period.

Likewise, the number three station also periodically transmits the position information.

Then, when the aircraft on which the number one station is provided has reached an operation airspace, the aircraft is required to finely turn the direction of flight thereof so that the number one station transmits the position information by using the under-operation position information transmission cycle period. In the case shown in FIG. 10, the number one station transmits the position information by setting the transmitter station number to 1, the total number of transmitter stations to 3, and the transmission cycle period to 30 seconds as the header information. The number two station estimates, from the header information from the number one station, that the vacant communication slot is an even-numbered one so that it selects the second communication slot. The number two station transmits the position information by setting the transmitter station number to 2, the total number of transmitter stations to 2, and the transmission cycle period to 180 seconds as the header information. The number three station estimates that the vacant communication slot is an even-numbered one, similarly to the number two station, and performs transmission by using the fourth communication slot by assuming that the number two station uses the second communication slot.

With the time-division transmission timings occupied by the base station 5 and the terminal stations 4 being distributed over the plurality of transmission cycle periods, it becomes possible to perform communication by allowing the co-existence of periodic communication sessions using different transmission cycle periods. By increasing or reducing the transmission cycle periods as required, the use efficiency of one frequency can be enhanced and information can be shared among a larger number of other terminal stations 4 by using one frequency.

Embodiment 3

Figure 11:
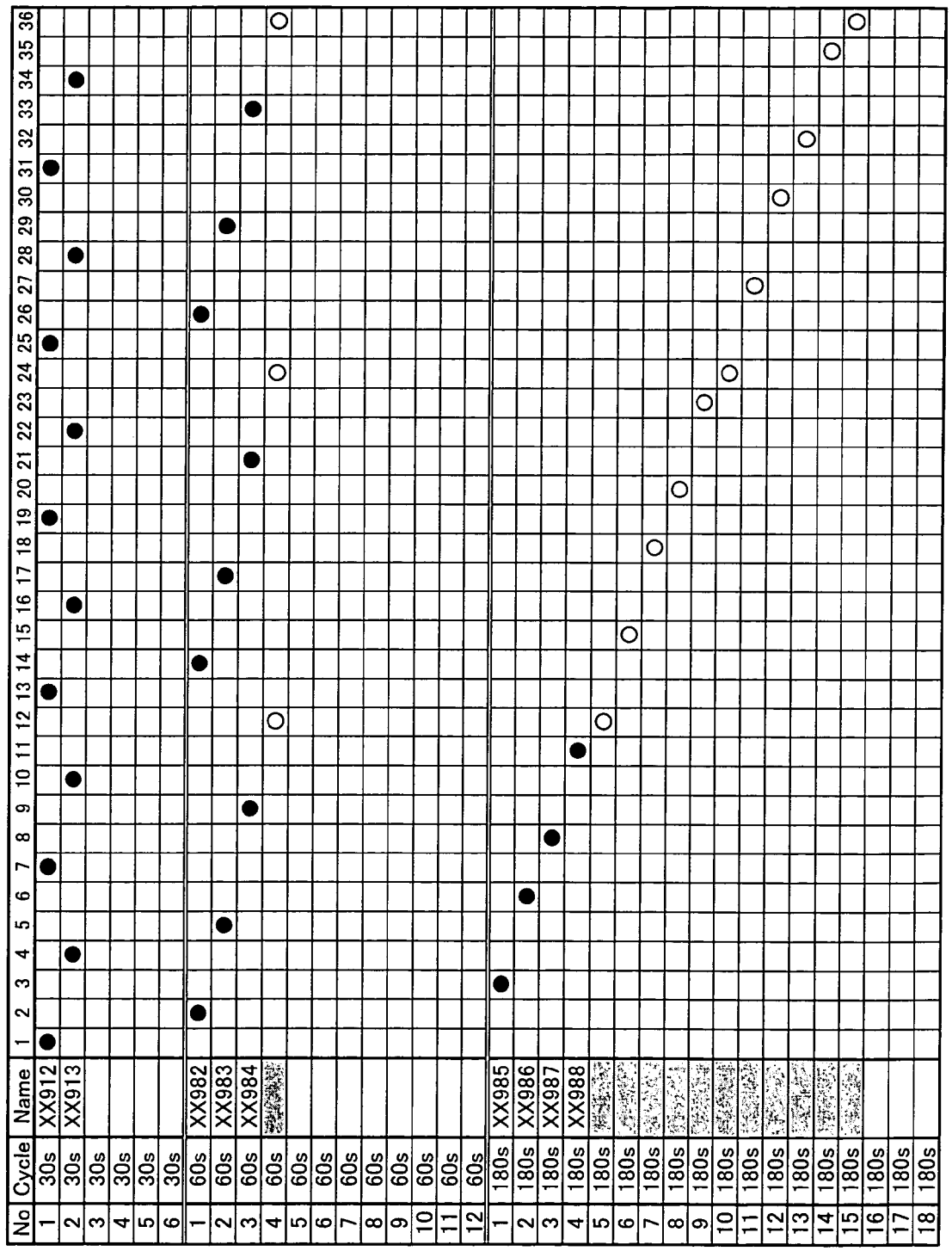
FIG. 11 is a diagram showing the use status of communication slots which are displayed on a display panel.

FIG. 11 shows the use status of communication slots which are displayed on a display panel according to a third embodiment of this invention.

In the drawing, three-level transmission cycle periods are set such that the shortest transmission time is 5 seconds, the reduced transmission cycle period 1 is 30 seconds, the reduced transmission cycle period 2 is 60 seconds, and the basic cycle period is 180 seconds, while solid and hollow circles represent which ones of the communication slots are in use or not. The solid circles represent in-use status and the hollow circles represent vacancy.

Any of the terminal stations 4 newly attempting the establishment thereof checks for the presence or absence of the new establishment of another station throughout the entire span of one basic transmission cycle period. For example, when the use status of the communication slots as shown in FIG. 11 are displayed, the total number of transmitter stations in the head information of a communication packet flowing in each of the communication slots should be 9. If the total number of transmitter stations in the header information remains 9, any of the communication slots with the hollow circles in FIG. 11 are selected in an attempt to perform the periodic information communication using the basic transmission cycle period. New establishment of a station in the reduced transmission cycle period 1 cannot be performed until part of the transmission from another station is completed.

The communication slot is thus selected and necessary information is inputted from the setting input means 33 of the map display device 3, based on which the setting input unit 21 transmits associated information to the transmission timing controller 18.

In such a wireless modem device 2, the states of the communication slots used for transmission throughout the entire span of one basic transmission cycle period are displayed as a list so that first-sight visual recognition of the use status of the communication slots is enabled at the base station 5 and each of the terminal stations 4.

In addition, it is also possible to recognize the use status of the communication slots used throughout the entire span of one basic transmission cycle period, compare the use status with the state of operation, and manually set vacant communication slots.

Embodiment 4

Figure 12:
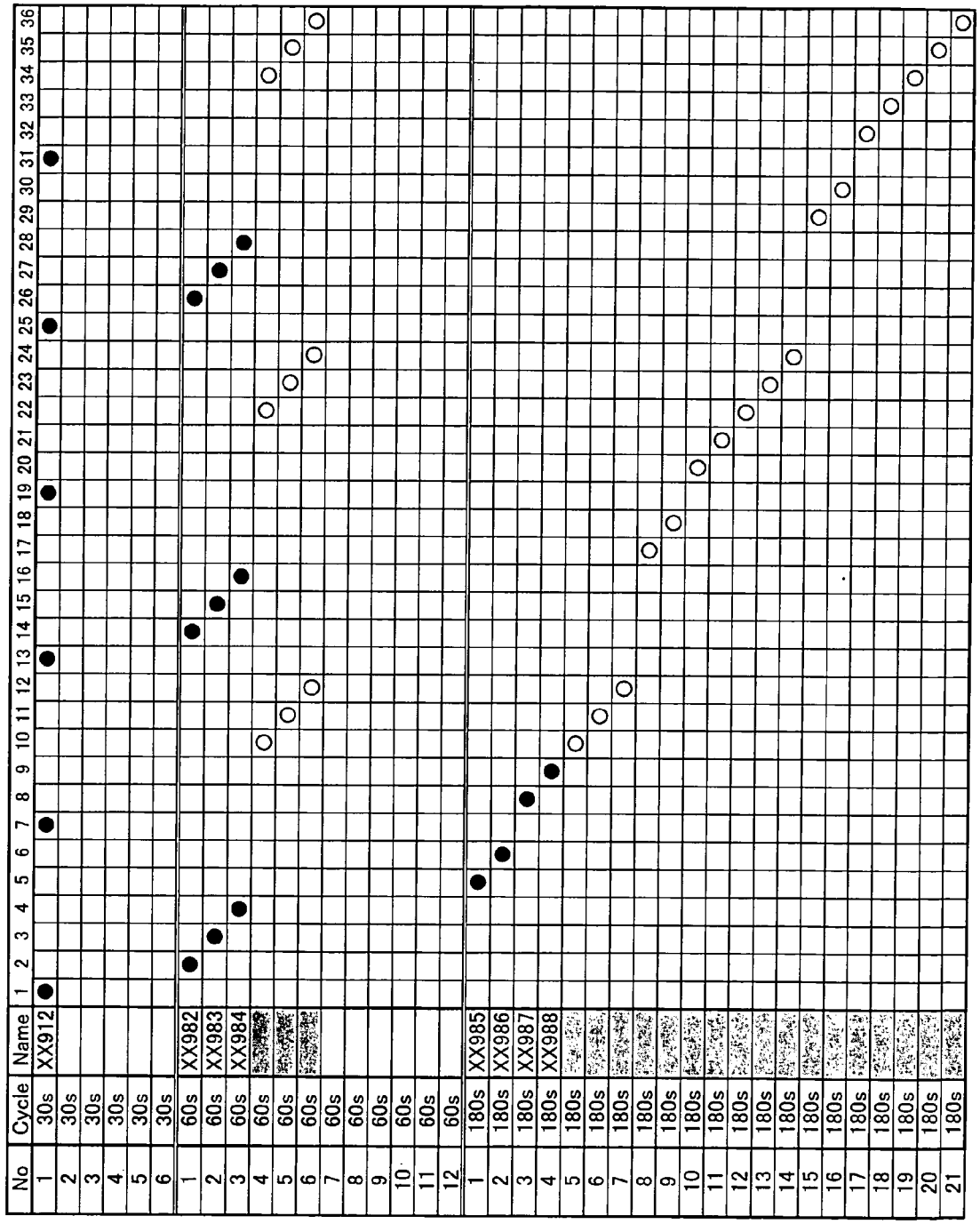
FIG. 12 is a diagram illustrating a method of selecting a communication slot in the transmission timing controller of a wireless modem device according to a fourth embodiment of this invention.

FIG. 12 is a view illustrating a method for selecting a communication slot in the transmission timing controller of a wireless modem device according to a fourth embodiment of this invention. The wireless modem device 2 of the fourth embodiment is different from the wireless modem device 2 of the first embodiment in that the means for selecting a vacant communication slot is provided in the transmission timing controller.

The transmission timing controller 18 selects a communication slot based on the transmission cycle period and the total number of transmitter stations each stored in a file or the like in accordance with a selection rule. The selection rule selects a communication slot by assigning decreasing priorities to the reduced transmission cycle period 1, the reduced transmission cycle period 2, and the basic transmission cycle period in this order, as shown in FIG. 12. The solid circles represent currently allocated communication slots and the hollow circles represent communication slots which can be newly allocated. If new establishment of a station in, e.g., the basic transmission cycle period is attempted in this state, the tenth communication slot is selected as the communication slot to be used. If new establishment of a station in the reduced transmission cycle period 2 is attempted, on the other hand, the tenth, twenty-second, and thirty-fourth communication slots are selected as the communication slots to be used. In this state, however, new establishment of a station cannot be performed in the reduced transmission cycle period 1.

Since such a wireless modem device 2 selectively determines a vacant communication slot based on the transmission cycle period and the total number of transmitter stations in accordance with the predetermined rule, there is no erroneous selection of a communication slot resulting from the intervention of the judgment of an operator.

Embodiment 5

Figure 13:
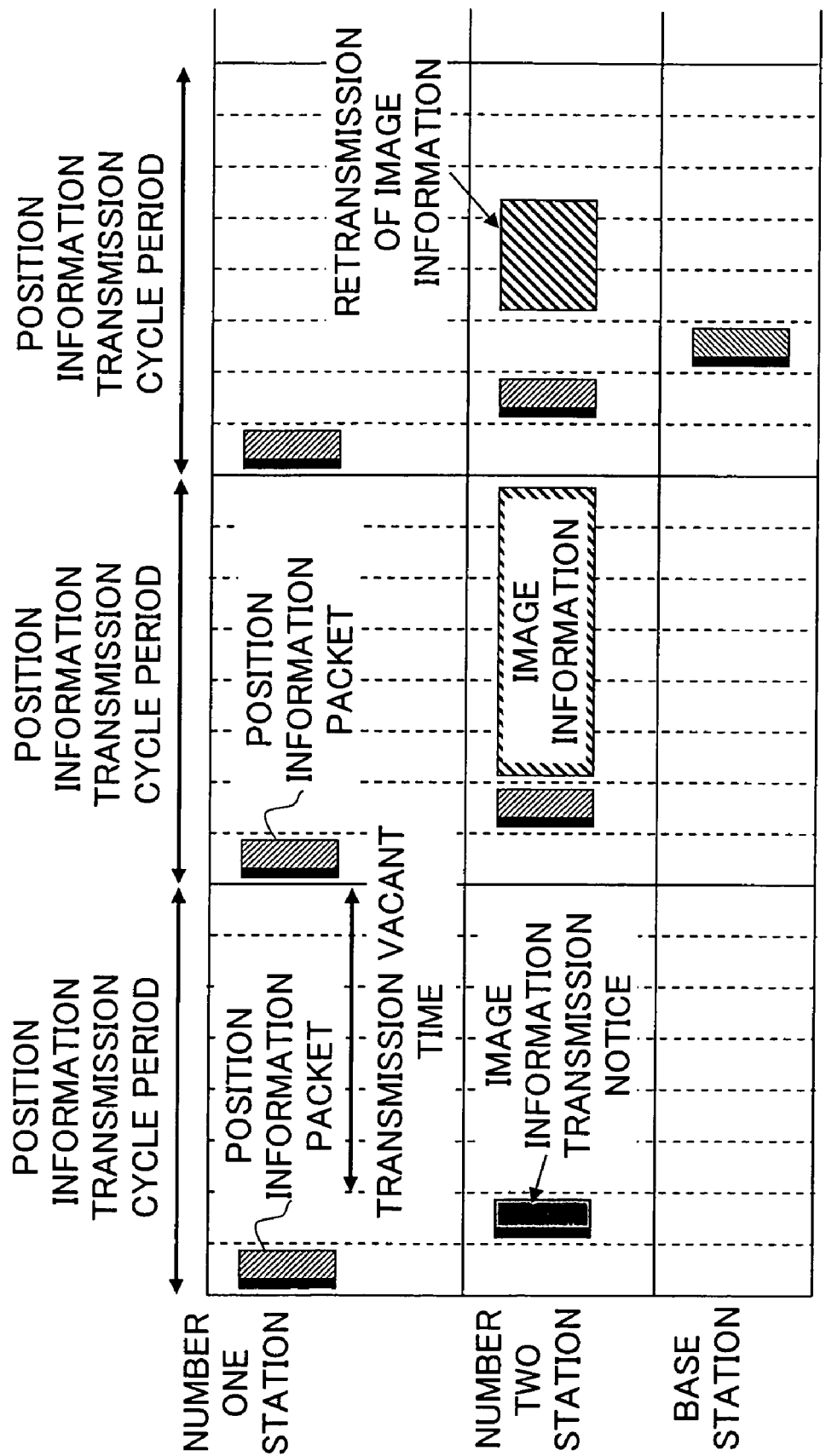
FIG. 13 is a transmission timing chart for a wireless modem device according to a fifth embodiment of this invention.

FIG. 13 is a view showing a transmission timing for a wireless modem device according to a fifth embodiment of this invention.

A description will be given to the procedure for transmitting the large-capacity information within the basic transmission cycle period as the position information transmission cycle period.

(a) The number two station attempting to transmit the large-capacity information to the base station 5 produces data trains by dividing the large-capacity information into transmission sizes each transmittable by using one communication slot and sends the data trains to the encryption processor 11. The encryption processor 11 encrypts the data trains.

(b) The number two station checks communication packets from other stations throughout the entire span of one position information transmission cycle period and checks a vacant communication slot.

(c) The number two station encrypts the data trains and transmits the encrypted data trains to the base station by using a vacant communication slot.

(d) The base station checks whether or not the data trains that have been sent were received correctly. If there is any data train that could not be received correctly, a request for the retransmission of the data train is sent to the number two station. If all of the data trains has been received correctly, the data trains are synthesized and restored to the large-capacity information.

(d) The number two station receives information on the state of reception of the data trains of the large-capacity information that has been transmitted previously and sent from the base station 5.

(e) In the information on the state of reception that has been received, the data train of which the reception was unsuccessful at the base station 5 is transmitted again to the base station 5 by using a vacant communication slot.

A description will be also given to the procedure for transmitting video information.

(a) At the number two station attempting to transmit the large-capacity information to the base station 5, a captured video image inputted from the video image capturing device 7 such as a digital camera or a digital video camera to the map display device 3 is temporarily stored in the image file 30 and then transmitted from the activity report transmitter 25 to the information processing unit 10 of the wireless modem device 2.

(b) At the number two station, the information processing unit 10 divides the captured video image in vertical and horizontal directions to produce data trains, adds the respective numbers of data train components in the vertical and horizontal directions to the header, and transmits the resultant communication packet as an image information transmission notice to the base station 5. At the number two station, a vacant communication slot in the position information transmission cycle period is examined and the data trains are transmitted by using the vacant communication slot. Each of the data trains has a header appended thereto and is structured as a communication packet.

(c) At the base station 5, the presence or absence of abnormality in the data trains is checked at an estimated reception completion time obtained from the header of the image information transmission notice or later and, if an abnormality is found, a retransmission request to retransmit the data train with the abnormality is transmitted to the number two station. The number two station retransmits the data train with the abnormality.

(d) At the base station 5, after all the data trains for the captured video image are received normally, the respective numbers of the data train components in the vertical and horizontal directions are checked from the header of the image information transmission notice and the data trains for the received captured video image are re-synthesized into the video image.

(e) After the reception of all the data trains is completed normally, the base station 5 transmits information on the completion of video image reception to the number two station.

Since such a wireless modem device transmits even large-amount of information by dividing it into sizes each transmittable by using one communication slot and transmits it by using a vacant communication slot, the periodic information communication is not interrupted.

In addition, normal data can be transmitted in a short period of time by transmitting, in the event of the occurrence of a communication error, only the data train in which the error has occurred by using a vacant communication slot, not by retransmitting all the information.

Embodiment 6

Figure 14:
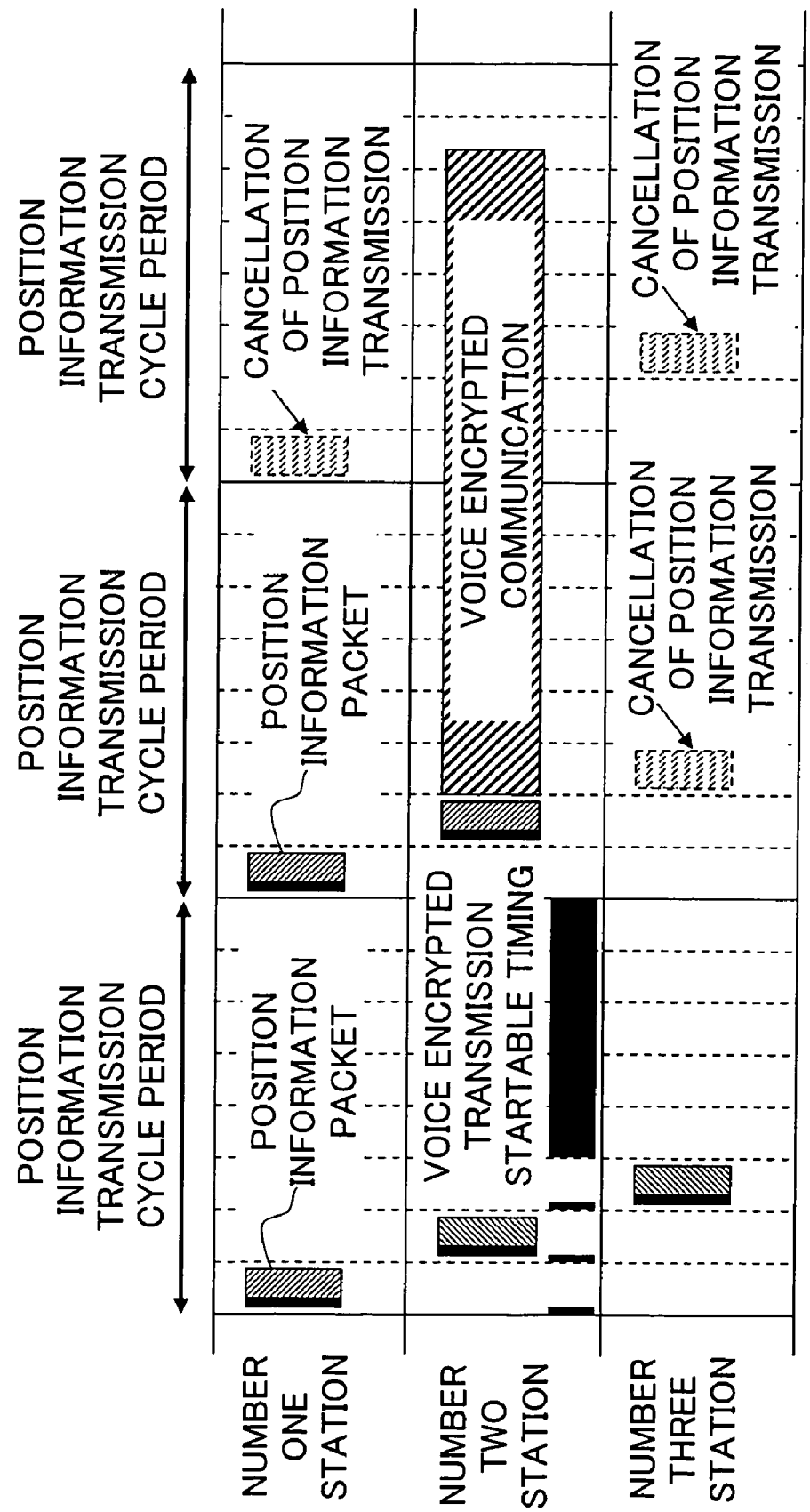
FIG. 14 is a transmission timing chart for a wireless modem device according to a sixth embodiment of this invention.

FIG. 14 is a view showing a transmission timing for a wireless modem device according to a sixth embodiment of this invention.

The wireless modem device according to the sixth embodiment allows voice encrypted conversation. A description will be given to the procedure for transmitting a voice encrypted conversation with reference to FIG. 14. The description will be given by using, as an example, the conversation of the number two station with another terminal station.

(a) At the number two station, a voice encrypted conversation is requested by pressing a microphone PPT.

(b) After the microphone PPT is pressed at the number two station, transmission from itself or another station in the position information transmission cycle period at that time is checked. Since the position information from each of the number one and three stations has been transmitted by the periodic information communication, the transmission timing controller selectively determines the transmission start timing after transmission from its own station in the next position information transmission cycle period.

(c) At the number two station, digital voice transmission is started in synchronization with the transmission start timing.

(d) A digital voice encryption lamp is turned on.

The transmission timing controller 18 performs the transmission of the periodic communication information and the large-capacity information after confirming that communication was not performed during the period of the communication collision check time (which is set to, e.g., 1 second) from the beginning of the communication slot. This allows preferential communication (voice encrypted conversation or the like) to be performed even without considering the transmitting timing for the periodic communication.

Such a wireless modem device enables asynchronous communication, such as voice communication, to be performed for an arbitrary period even when communication in accordance with a time-division synchronous method is performed.

Embodiment 7

Figure 15:
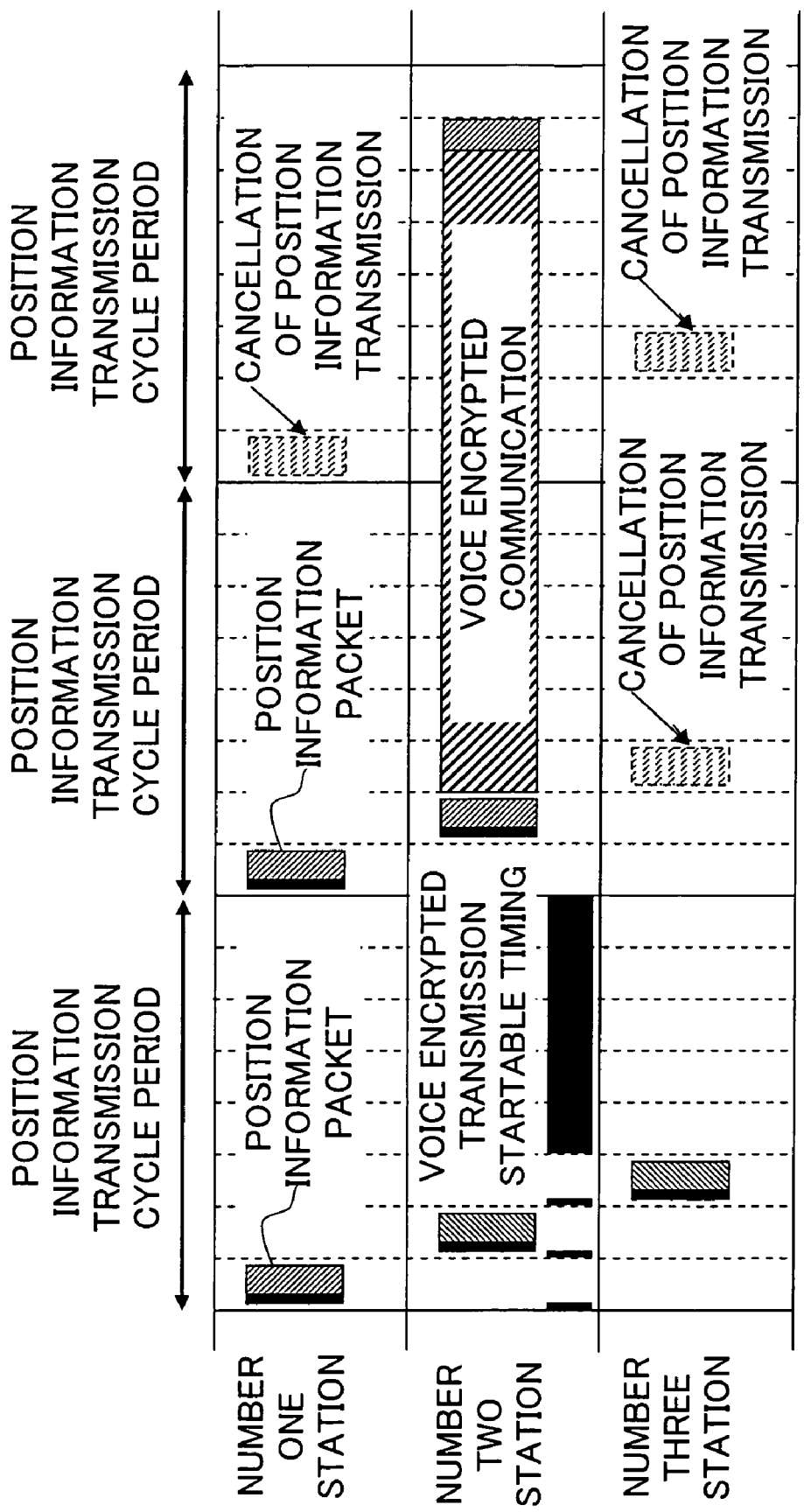
FIG. 15 is a transmission timing chart for a wireless modem device according to a seventh embodiment of this invention.

FIG. 15 is a diagram showing a transmission timing for a wireless modem device according to a seventh embodiment of this invention.

The wireless modem device according to the seventh embodiment is different from the wireless modem device according to the sixth embodiment only in that the periodic communication information is transmitted continuously to the voice encrypted communication. The other parts are the same, so that the description thereof will be omitted.

Such a wireless modem device can update the information of the periodic communication interrupted by preferential communication by adding the information of the interrupted periodic communication to the end of the preferential communication.

The effect according to the time-division synchronous wireless modem device according to this invention is that, since the communication slots which are vacant at the time of an attempt to establish a station can be used freely without fixing the communication slots to the base station and the terminal stations, the use efficiency of the communication slots is enhanced and transmission from a larger number of terminal stations is enabled.

INDUSTRIAL APPLICABILITY

In the case where the time-division synchronous wireless modem device according to this invention is a system which has already been provided with a radio channel, the addition thereof enables information transmission in accordance with a time-division synchronous method.

The invention claimed is:

1. A time-division synchronous wireless modem device provided at each of a plurality of wireless stations in a wireless system which transmits and receives communication packets containing a header between the individual wireless stations via one wireless channel by using, on a one-by-one basis, any of communication slots obtained through time division of a predetermined transmission cycle period by a predetermined unit transmission time, the time-division synchronous wireless modem device being characterized by comprising:

a modem unit which transmits and receives the communication packets;

a communication state determination unit which obtains a transmission cycle period and the total number of wireless stations in use each contained in a header of the received communication packet; and a transmission timing controller which selectively determines an arbitrary one of the communication slots in a next transmission cycle period when the communication packet is not received during the entire span of the one transmission cycle period, or selectively determines the one of the communication slots to be used by estimating a vacant one of the communication slots in the next transmission cycle period from the transmission cycle period and the total number of wireless stations in use each obtained by the communication state determination unit when the communication packet is received.

2. A time-division synchronous wireless modem device according to claim 1, characterized in that:
   at least one reduced transmission cycle period composed of an integral fraction of the transmission cycle period is predetermined to allow transmission and reception to be performed based on either of the transmission cycle period and the reduced transmission cycle period; and
   the transmission timing controller selects one of the transmission cycle period and the reduced cycle period, and selectively determines an arbitrary one of the communication slots in the next selected transmission cycle period or reduced cycle period when the communication packet is not received during the entire span of the selected transmission cycle period or reduced cycle period, or selectively determines the one of the communication slots to be used by estimating a vacant one of the communication slots in the next selected transmission cycle period or reduced cycle period from the transmission cycle period and the total number of wireless stations in use each obtained by the communication state determining unit when the communication packet is received.

3. A time-division synchronous wireless modem device according to claim 2, characterized by comprising a display unit which displays the transmission cycle period, the reduced cycle period, and the communication slot in use.

4. A time-division synchronous wireless modem device according to claim 2, characterized in that the transmission timing controller selectively determines the one of the communication slots to be used in the next transmission cycle period or in the next reduced cycle period based on information inputted from an outside.

5. A time-division synchronous wireless modem device according to claim 2, characterized in that the transmission timing controller selectively determines the one of the communication slots to be used in the next transmission cycle period or in the next reduced cycle period in accordance with a rule predetermined based on the selected transmission cycle period or reduced cycle period and the received communication slot.

6. A time-division synchronous wireless modem device according to claim 1, characterized in that the transmission timing controller determines, after the transmission, whether or not transmission therefrom has been performed normally from information on the total number of wireless stations contained in the header of the communication packet transmitted from another wireless station.

7. A time-division synchronous wireless modem device according to claim 1, characterized by comprising an information processing unit for dividing large-capacity information which cannot be transmitted by using one of the communication slots into data trains each transmittable by using one of the communication slots, and characterized in that the transmission timing controller controls a transmission timing to allow each of the data trains to be transmitted by using a vacant one of the communication slots.

8. A time-division synchronous wireless modem device according to claim 7, characterized in that the information processing unit checks the presence or absence of abnormality in any of the received data trains and requests retransmission when the abnormality is found or requests re-synthesis of the data trains when the abnormality is not found.

9. A time-division synchronous wireless modem device according to claim 1, characterized in that the transmission timing controller controls a transmission timing such that, based on a request to transmit non-periodic continuous information inputted from an outside, the communication slot is used continuously for the non-periodic continuous information preferentially to another communication.

10. A time-division synchronous wireless modem device according to claim 9, characterized in that the transmission timing controller resumes, after the transmission of the non-periodic continuous information is completed, the transmission of information transmitted on a per transmission-cycle-period basis that cannot be transmitted due to the transmission of the non-periodic continuous information.

11. A time-division synchronous wireless modem device according to claim 1, wherein the transmission timing controller determines that the communication packet is not received during the entire span of the one transmission cycle period and selects the arbitrary one of the communication slots in the next transmission cycle period.

12. A time-division synchronous wireless modem device according to claim 1, wherein the transmission timing controller determines that the communication packet is received during the entire span of the one transmission cycle period and selectively determines the one of the communication slots to be used in the next transmission cycle period from the transmission cycle period and the total number of wireless stations in use received from the communication state determination unit.

13. A time-division synchronous wireless device according to claim 1, wherein the modem unit transmits and receives the communication packets containing the header, between the individual wireless stations via one wireless channel by using, on a one-by-one basis, any of communication slots obtained through time division of a predetermined transmission cycle period.

14. A time-division synchronous wireless device according to claim 1, wherein at least one of transmission cycle periods in which the communication packets are transmitted and received is a reduced transmission cycle period that is an integral fraction of the transmission cycle period.

15. A time-division synchronous wireless device according to claim 1, wherein the wireless station is a terminal station that is positioned on an aircraft, a ship, or an automobile and performs short-wave wireless communication with a base station positioned on a ground and wherein the wireless station periodically communicates positional information and at least one of non-periodic large capacity non-continuous information and non-periodic continuous information.

16. A method for transmitting and receiving communication packets in transmission cycle periods of a time division synchronous wireless system, the method comprising:
   receiving by a wireless node at least one communication packet comprising a header from another wireless node via one wireless channel by using, on a one-by-one basis, one of communication slots obtained through time division of a predetermined transmission cycle period;
   obtaining by the wireless node a transmission cycle period and total number of wireless nodes that are being used from the header of the respective received communication packet;
   determining by the wireless node whether the communication packet is received in a current transmission cycle period;

if the communication packet is not received during entire span of the current transmission cycle period, selecting an arbitrary communication slot for the wireless node to transmit data in next transmission cycle period; and if the communication packet is received in the current transmission cycle period, determining a vacant communication slot for the wireless node to transmit data in the next transmission cycle period, wherein the vacant communication slot is determined based on the obtained transmission cycle period and the total number of wireless stations being used.

17. The method according to claim 16, wherein the transmission cycle periods comprise at least one reduced transmission cycle period composed of an integral fraction of the transmission cycle period is predetermined to allow transmission and reception to be performed based on either of the transmission cycle period and the reduced transmission cycle period; and wherein the selection further comprises:

selecting one of the transmission cycle period and the reduced cycle period, and selectively determining an arbitrary one of the communication slots in the next selected transmission cycle period or reduced cycle period when the communication packet is not received during the entire span of the selected transmission cycle period or reduced cycle period, or selectively determining the one of the communication slots to be used by estimating a vacant one of the communication slots in the next selected transmission cycle period or reduced cycle period from the transmission cycle period and the total number of wireless stations being used.

18. The method according to claim 16, wherein the transmission cycle periods comprise at least one reduced transmission cycle period composed of an integral fraction of the transmission cycle period and at least one short transmission cycle period are predetermined to allow transmission and reception to be performed based on either of the transmission cycle period, the reduced transmission cycle period, and the short transmission cycle.

* * * * *